United States Patent Office 3,699,078
Patented Oct. 17, 1972

3,699,078
POLYHYDROXAMIDES AND POLYURETHANES THEREFROM
Anthony J. Castro, Oak Park, Ill., assignor to Akzona Incorporated, Asheville, N.C.
No Drawing. Filed May 18, 1970, Ser. No. 38,561
Int. Cl. C08g 22/08, 22/44
U.S. Cl. 260—47 CB                         4 Claims

ABSTRACT OF THE DISCLOSURE

Polyalkanol arylaliphatic amides and polyurethanes obtained by reaction of such amides with polyisocyanates. The polyurethanes may be formulated for use as foams, coatings, elastomers, and adhesives. The polyurethanes produced according to this invention have excellent fire retardant properties and dimensional stability.

Polyurethanes, obtained by the reaction of a polyfunctional hydroxyl compound (polyol) with a polyisocyanate are well known. For example, see Saunders, J. H. and Frisch, K. C. "Polyurethanes, Chemistry and Technology" Part I, Chemistry, New York, Interscience Publishers, 1962, and Dombrow, B. A. "Polyurethanes" second edition, New York, Reinhold Publishing Corp., 1965.

Polyurethanes have most generally been obtained by utilization of polyols derived by ethoxylation or propoxylation of polyhydroxylic substances such as sorbitol, sucrose, and alpha-methylglucoside. Polyurethane coatings have been produced from higher molecular weight polyols derived from polymeric fatty acids as taught by U.S. Pat. No. 3,267,080. The polyols taught by U.S. Patent 3,267,080 are not suitable for the production of polyurethane foams without addition of catalysts according to Belgian Pat. No. 718,747 which teaches that foams may be produced polyols obtained from the condensation of polymeric fatty acids wherein the by-products are not removed and dialkanolamines. Belgian Pat. No. 722,287 teaches the production of polyurethane foams from polyols obtained from the condensation of fatty acids under specific reaction conditions and dialkanolamines. However, the above-mentioned polyurethanes have not been entirely satisfactory for industrial use, especially in view of their lack of dimensional stability and their lack of resistance to fire.

An object of my invention is to provide novel polyalkanol aryl aliphatic amides.

A further object of this invention is to provide novel polyurethanes produced by the condensation reaction of polyalkanol aryl aliphatic amides of this invention with polyisocyanates.

A still further object of this invention is to provide polyurethane foams having greater dimensional stability than previous polyurethane foams.

Still further it is an object of this invention to provide polyurethanes having greater fire resistance than existing polyurethanes.

Other objects and advantages will become apparent in the detailed description and specific examples set forth below.

The present invention utilizes polyhydroxamides obtained by the reaction of arylated carboxylic acids or esters reacted with dialkanol amines. The reaction of acids and esters with dialkanol amines is generally well known in the art. The use of arylated acids and esters, however, to my knowledge, have not been previously performed.

The production of arylated aliphatic acids by alkylation of aromatic compounds such as benzene, naphthylene and anthracene with unsaturated acids using hydrofluoric acid as a condensing agent is taught by U.S. Patent 2,275,312. Production of arylated aliphatic acids by use of an aluminum chloride catalyst is known in the art. An improved process for mono-alkylation of aromatic compounds is taught by copending U.S. patent application Ser. No. 679,251 filed Oct. 30, 1967, now Pat. No. 3,564,030, Process for Mono-Alkylation of Aromatic Compounds. The use of activated clay for the direct arylation of fatty acids is described in U.S. Patent 3,074,983. Depending upon reaction conditions, the reaction of the unsaturated carboxylic acid with an aromatic nucleus may result in mono-, di-, and tri-alkylation of the aromatic group. For example, reaction of benzene and oleic acid may result in phenylstearic, phenylenedistearic, phenylenetristearic and phenylenetetrastearic acid. The compounds of this invention, however, are characterized by the presence of an aromatic group attached to a carbon atom in the chain of the aliphatic carboxylic acid, and the polycarboxylic acids are characterized by linkage through the aromatic group.

Arylated aliphatic carboxylic acids suitable for use in my invention have the formula

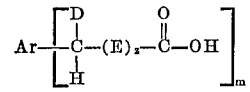

wherein Ar is selected from the mono-, di-, and tri-carbocyclic aromatic groups and their substituted derivatives wherein the substitution is 1 to 2 radicals selected from the group consisting of methyl, methoxy, phenoxy, and phenyl; D is selected from the group consisting of hydrogen, alkyl radicals having 1 to about 21 carbon atoms and alkenyl radicals having 2 to about 21 carbon atoms, E is selected from the group consisting of alkylene radicals having 1 to about 21 carbon atoms and unsaturated divalent hydrocarbon aliphatic radicals having 2 to about 21 carbon atoms, provided the total number of carbon atoms in the molecule is less than about 30; $z$ is selected from the integers 0 and 1; and $m$ is an integer of 1 to about 4.

One important subclass of arylalkyl carboxylic acids suitable for use in my invention have the formula

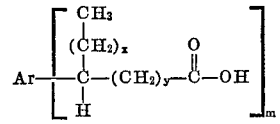

wherein Ar and $m$ are as defined above; $x$ is an integer of 0 to 20, $y$ is an integer of 0 to 20, provided the sum of $x$ and $y$ is less than 27. In a particularly important subclass $x$ is an integer of 0 to 15, $y$ is an integer of 0 to 15, and the sum of $x$ and $y$ is 15.

Specific arylated aliphatic carboxylic acids suitable for use in my invention include phenylacetic acid, phenyl propionic acid, phenylbutyric acid, phenylvaleric acid, phenylcaproic acid, phenylenanthic acid, phenylcaprylic acid, phenylpelargonic acid, phenylcapric acid, phenylundecylic acid, phenyllauric acid, phenylmyristic acid, phenylpalmitic acid, phenylstearic acid, phenylarachidic acid, phenylbehenic acid, phenyl lignoceric acid, phenylcerotic acid, phenylmontanic acid, and phenylmelissic acid and the corresponding naphthyl and anthracyl substituted compounds and their substituted derivatives having 1 to 2 radicals of methyl, methoxy, phenoxy and phenyl substituted on the aromatic nucleus.

Arylated mono and di-unsaturated acids such as obtained by the arylation of unsaturated acids as found in natural fats and oils such as are obtained from animal, vegetable or marine fats and oils are suitable. The acids obtained from tall oil and marine oil are especially suitable. Arylated dienoic acids include sorbic acid and linoleic acids; while suitable trinoic acids include linolenic acid and eleostearic acid.

Esters of the above arylated aliphatic carboxylic acid may also be used, especially the lower alkyl esters which contain 1 to about 4 carbon atoms, the methyl, ethyl, propyl and butyl esters.

The dialkanolamines suitable for use to form the polyhydroxamides of my invention have the formula

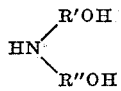

wherein R' and R" are divalent alkylene groups having 1 to 8 carbon atoms. The alkylene groups may be straight chain or branched chain including methylene, dimethylene, trimethylene, tetramethylene, pentamethylene, hexamethylene, heptamethylene, octamethylene and their branched chain isomers such as 2-methyl-1,3-propylene, 1-methyl-1,3-propylene, and 1-methyl ethylene. In one preferred subclass R' and R" are both ethylene; diethanolamine.

The polyhydroxamides of my invention are obtained by reaction of an arylated aliphatic carboxylic acid as defined above with a dialkanolamine resulting in a polyhydroxamide having the formula

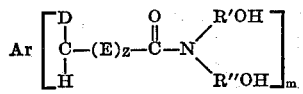

wherein Ar, D, E, z, R', R" and m are as defined above.

One important subclass of polyhydroxamides of my invention have the formula

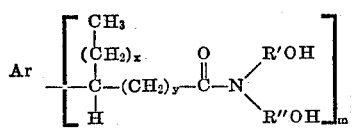

wherein Ar, x, y, R', R" and m are as defined above. An especially important subclass of polyhydroxamides of my invention have the sum of x and y being 15. Preferred subclasses of polyhydroxamides of my invention are diols wherein m is 1 and tetraols wherein m is 2. Such polyhydroxamides may be obtained by the reaction of arylated stearic acid and diethanol amine. The products are usually mixtures of arylstearyl bis-(2-hydroxyethyl)amine and arylene distearyl tetrakis-(2-hydroxyethyl)diamide.

The polyhydroxamides of my invention are prepared by reaction of any suitable arylated aliphatic carboxylic acid with an alkanol amine set forth above. The reaction is principally a condensation reaction between the hydroxy group of the acid and the active hydrogen of the amine. Substantial amounts of arylated aliphatic ester, arylated aliphatic amido ester, arylated aliphatic di-ester, and arylated aliphatic di-ester amide may be produced. Up to 50 mole percent of the reaction products other than polyhydroxamides may be present in the polyhydroxamides used for preparation of satisfactory polyurethenes. An equivalent amount, or preferably an excess, of dialkanol amine is mixed with the arylated aliphatic carboxylic acid with agitation and heat. It is preferred to use from about 5 to 60% equivalent excess of amine. Heating from about 80° C. to about 210° C. is suitable depending upon the reactants. For most reactants it is preferable to maintain the reaction at about 130° to 160° C. The velocity of the reaction depends upon the heat and I have found suitable times of reaction vary from about 15 minutes to about 10 hours depending upon the reactants and the temperature. The acid and amine are heated and agitated until the acid value is less than 60, and preferably less than 10. It is preferred to remove the water of reaction by vacuum. The reaction may also be carried out using an azeotropic solvent system to remove the water. As stated above, the polyhydroxamides may be formed from the corresponding esters or by other known methods of forming amides such as transamidation of an unsubstituted amide or by alkoxylation of the arylated unsubstituted amide.

The above-described polyalkanol arylaliphatic amides may be reacted with organic polyisocyanates to form polyurethanes according to this invention. Mixtures of the above-described polyalkanol aryl aliphatic amides and mixtures of the below-described polyisocyanates may be used to form polyurethanes according to my invention.

Any suitable organic polyisocyanate may be used in the preparation of polyurethanes in accordance with this invention. Both aromatic and aliphatic polyisocyanates are suitable in the preparation of polyurethanes of this invention. Suitable polyisocyanates include polymethylene polyphenyl isocyanate, methylene bis-(4-phenyl-isocyanate), toluene-2,4-diisocyanate, toluene-2,6-diisocyanate, 1,5-naphthalene diisocyanate, p-phenylene diisocyanate, 3,3-dimethyl-4,4-diphenyl-methane diisocyanate, 4,4-diphenylisopropylidene diisocyanate, 3,3-dimethyl-4,4-diphenyl diisocyanate, hexamethylene diisocyanate, cyclohexylene-1,4-diisocyanate, hexamethylene diisothiocyanate, p-phenylene diisothiocyanate, and benzene-1,2,4-triisothiocyanate. Long chain polyisocyanates such as those derived from polymeric fatty acids may be used.

Another suitable class of higher aliphatic polyisocyanates or diisocyanates has the formula

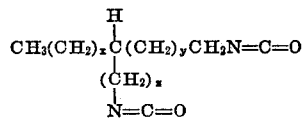

wherein z is an integer from 0 to 2, x and y are integers from 0 to about 19 and the sum of x and y is from about 7 to 19. The diisocyanate of the above formula wherein the sum of x and y is from about 12 to 19 carbon atoms is especially suitable in possessing extremely low toxicity.

Typical compounds which fall within the above formula are diisocyanates derived from diamino compounds including aminolaurylamine,
aminomyristylamine,
aminopalmitylamine,
aminostearylamine,
aminoarachidylamine,
aminobehenylamine,
aminolignocerylamine,
aminomethyllaurylamine,
aminomethylmyristylamine,
aminomethylpalmitylamine,
aminomethylstearylamine,
aminomethylarachidylamine,
aminomethylbehenylamine,
aminomethyllignocerylamine,
aminoethyllaurylamine,
aminoethylmyristylamine,
aminoethylpalmitylamine,
aminoethylstearylamine,
aminoethylarachidylamine,
aminoethylbehenylamine,
aminoethyllignocerylamine,
9-aminoundecylamine,
9-aminomethylundecylamine,
9-aminoethylundecylamine and the like. Mixtures of two or more dissocyanates may be used.

Especially preferred diisocyanates are derived from diamino compounds including 9(10)-aminostearylamine, 9(10)-aminoundecylamine and 9-aminomethylundecylamine. Especially preferred diisocyanates are derived from diamino compounds selected from the group consisting of 9(10) - aminostearylamine and 9(10) - aminomethylstearylamine.

Polyisocyanates suitable for use in this invention are represented by the formula

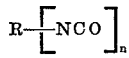

wherein R is selected from polyvalent aliphatic hydrocarbon radicals having 2 to about 40 carbon atoms, polyvalent alicyclic hydrocarbon radicals having from about 5 to 20 carbon atoms, polyvalent aromatic hydrocarbon radicals having 6 to about 10 carbon atoms, polyvalent arylalkyl radicals having 7 to about 24 carbon atoms, and $n$ is an integer of 2 to about 4. The corresponding polyisothiocyanates are also suitable for use in this invention.

The preparation of polyurethanes by reaction of diols with diisocyanates according to our invention may be represented by the chemical formula

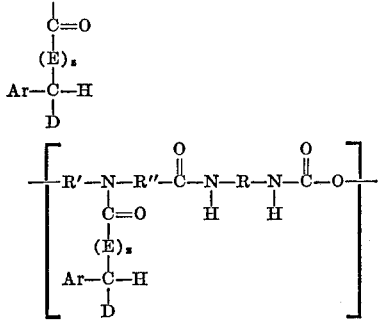

The complex formula of polyurethanes of our invention prepared by the reaction of the polyhydroxy compounds described above with polyisocyanates may be represented as

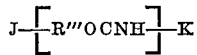

wherein R''' is the radical described above as R' or R'' and J and K are complex polyradicals formed by the condensation of the polyhydroxamide of the general formula

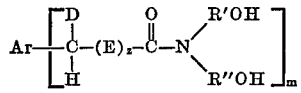

and the polyisocyanate of the general formula

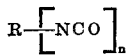

wherein Ar, D, E, R', R'', z, m, R and n are as described above.

The polyurethanes of this invention are prepared by mixing the polyalkanol aryl aliphatic amide described above with polyisocyanates at various isocyanate to hydroxy ratios. To obtain polyurethanes it is suitable to use polyisocyanate at isocyanate to hydroxyl function ratios of from about 0.90:1 to about 1.25:1. It is preferred to use an excess of isocyanate in a ratio of from about 1.02:1 to 1.1:1. The reaction can be carried out at any suitable temperature and may be carried out in the presence of catalysts such as N-methylmorpholine, tertiary amines such as trimethyl amine, triethyl amine and triethylene diamine, metal salts of organic acids such as zinc octanoate and dibutyl tin dilaurate, and diazabicycloalkene compounds such as 1,5 - diazabicyclo-[4.3.0]-nonene - 5 and 1,5 - diazabicyclo - [4.4.0] - decene - 5. Additives such as pigments, fillers, blowing agents and flow control agents may be added to the polyurethanes of this invention. Other polyols may be added to the polyols of this invention to modify properties of the resultant polyurethane. For example, high molecular weight polyether diols and triols may be added to increase flexibility; low molecular weight polyols may be added to increase stiffness such as N,N,N',N'-tetrakis-(2-hydroxypropyl)-ethylene diamine, glycerin, and trimethylolpropane.

Higher ratios of isocyanate to hydroxyl function of from about 1.5:1 to 2.0:1 may be used in the above reaction to prepare isocyanate terminated prepolymers. Such prepolymers are stable and may be further reacted with substances containing two or more reactive hydrogen atoms as determined by the Zerewitinoff Method or may be moisture cured.

Polyurethane coatings may be prepared preferably reacting diols of this invention with aliphatic diisocyanates. The coatings thus produced have good chemical resistance and may be applied by conventional methods.

Polyurethane elastomers and adhesives may also be prepared using the polyols of this invention. When preparing elastomers and adhesives it is preferred to utilize a diol of this invention with an aliphatic diisocyanate. In such preparations it is also preferred to utilize some monoisocyanate.

Superior foams are formulated utilizing the polyhydroxamides of this invention and aromatic polyisocyanates. It is preferred to use the higher polyisocyanates such as triisocyanate and tetraisocyanate. Conventional foaming or blowing agents such as fluoroalkanes, carbon dioxide formed by addition of water, or mixtures may be used.

The rigid polyurethane foams produced according to my invention have surprising dimensional stability under both high moisture and low moisture heat conditions. The dimensional stability of the polyurethane foams of my invention is several times better than dimensional stability of existing polyurethane foams. The dimensional stability of the polyurethane foam is important when forming laminated structures utilizing the polyurethane.

Polyurethane foams of my invention are self-extinguishing when their surface is exposed to a flame. The self-extinguishing characteristic of polyurethatne foams according to this invention is surprising in view of known polyurethane foams burning at the rate of from 4 to 8 inches per minute. The fire retardancy of polyurethane foams according to this invention permits the use of polyurethane foams for safe insulation purposes.

The polyalkanol aryl aliphatic amides and polyurethanes according to this invention are illustrated in preferred embodiments in the following examples.

EXAMPLE I

A mixture of 338 pounds of phenylstearic acid, 410 pounds of phenylene distearic acid and 252 pounds of diethanol amine was stirred and heated to and maintained at 130° C. for four hours. At the end of the four hours, the Acid Value of the mixture was 30. Maintaining the temperature at about 130° a vacuum of about 25 mm. mercury was applied until the Acid Value fell below 10. Heating and vacuum was then discontinued and dry nitrogen introduced for storage of the product. The product was principally a mixture of phenylstearyl bis-(2-hydroxyethyl)amide and phenylenedistrearyl tetraki-(2-hydroxyethyl)diamide. The product was a dark viscous liquid having a viscosity of about 90,000 cps. and having the following analysis:

Acid value _____ 4.55
Saponification value _____ 124.4
Amine value _____ 34.5
Hydroxy No. _____ 264

EXAMPLE II 84 grams of the mixture of amide and diamide produced in Example I was mixed with 16 grams of glycerin and stirred while adding one gram of dimethylsiloxane silicone oil surfactant (Dow Silicone Oil No. 520) and 30 grams of trichlorofluoromethane (Freon 11). After these components were added the mixture was stirred for about 15 seconds. Then 122 grams of polymethylene polyphenyleneisocyanate having an isocyanate equivalent value of 134 (PAPI) was added and mixing continued for about 15 seconds. The mixture was then poured into a mold and allowed to foam unrestrained. The cream time was 15 seconds; rise time 100 seconds; and tack free time 110 seconds. Good quality foam was produced, having the following physical properties:

Density, pounds/cu. ft.—1.94
Compression strength, p.s.i.—25
Tensile strength, p.s.i.—20
Closed cells—84.1%
Flammability, ASTM 1692—Self-extinguishing
Dimensional stability, one week 150° F., 100% relative humidity—0.4% volume

EXAMPLE III 3,735 grams of phenylstearic acid was mixed with 1,265 grams of diethanol amine, stirred and heated to and maintained at 130° C. for 20 hours. Samples were withdrawn at hourly periods up to 20 hours and analyzed for Amine Value and Acid Value, resulting in the following analysis:

| Time, hours | Acid value | Amine value |
|---|---|---|
| 1 | 69.5 | 88.2 |
| 2 | 56.8 | 72.2 |
| 3 | 35.2 | 56.2 |
| 4 | 28.8 | 50.0 |
| 5 | 9.0 | 39.0 |
| 6 | 2.5 | 39.0 |
| 7 | 2.0 | 35.2 |
| 8 | 1.2 | 33.8 |
| 9 | 1.1 | 34.3 |
| 10 | 0.6 | 32.2 |
| 11 | 0.3 | 32.8 |
| 12 | 0.3 | 31.8 |
| 13 | 0.3 | 32.6 |
| 14 | 0.3 | 32.7 |
| 15 | 0.4 | 32.9 |
| 16 | 0.2 | 32.1 |
| 17 | <.03 | 34.3 |
| 18 | <.03 | 32.2 |
| 19 | <.03 | 30.8 |
| 20 | <.03 | 31.8 |

It is seen from the above table that the Acid Value and Amine Value after 10 hours was essentially constant, showing that the phenylstearic acid was substantially completely reacted. The product obtained after four hours was a dark viscous liquid having a viscosity of about 8,000 cps. and was primarily phenylstearyl bis-(2-hydroxyethyl)amide.

EXAMPLE IV 84 grams of phenylstearyl bis-(2-hydroxyethyl) amide obtained at the 13 hour time shown in the table in Example III was mixed with 9.71 grams of glycerin and stirred while adding 1.9 grams of dimethyl siloxane silicone oil surfactant (Dow Silicone Oil No. 520), 0.375 gram of dimethyl dodecylamine catalyst, 228.1 grams of trichlorofluoromethane (Freon 11) and 114.2 grams of polymethylene polyphenyleneisocyanate having an isocyanate Equivalent Value of 134 (PAPI). Mixing was continued for 15 seconds after all of the components were added. The mixture was then poured into a mold and allowed to foam unrestrained. The Cream Time was 17 seconds, Rise Time 140 seconds and Tack Free Time 172 seconds. The foam produced has the following physical properties:

Density, pounds cu./ft.—2.37
Closed cells—88%
Dimensional stability, one week 150° F., 100% relative humidity—0.02% volume

EXAMPLE V

Polyurethane was produced in similar fashion as in Example IV from phenylstearyl bis-(2-hydroxyethyl)amide taken at the 18 hours reaction time shown in Example III. 41.5 grams of phenylstearyl bis-(2-hydroxyethyl) amide was mixed with 4.67 grams of glycerin and stirred while adding 0.92 gram of dimethyl siloxane silicone oil surfactant (Dow Silicone Oil No. 520), 0.20 gram of dimethyldodecylamine catalyst, 13.85 grams of trichlorofluoromethane (Freon 11). The components were stirred for about 15 seconds after which 56.24 grams of polymethylene polyphenyleneisocyanate having an isocyanate Equivalent Value of 134 (PAPI) was added and mixing continued for about 15 seconds. The mixture was then poured into a mold and allowed to foam unrestrained. The Cream Time was 17 seconds, Rise Time about 140 seconds and Tack Free Time about 170 seconds. The foam produced has the following physical properties:

Density, pounds/cu./ft.—2.37
Closed cells—88%
Dimensional stability, one week 150° F., 100% relative humidity—0.02% volume

EXAMPLE VI

Polyurethane foams were prepared by reaction of the polyol indicated with polymethylene polyphenylene isocyanate and subjected to the standard test for fire retardancy as set forth by the American Society for Testing Materials, Test No. 1692:

Polyurethane: Burning rate
  Polyurethane prepared from polyols obtained by reaction of 1:1 ratio of $C_{18}$ dimer to $C_{18}$ monomeric acid with ethanol amine _____ 4.1 inches per min.
  Polyurethane prepared from polyols obtained by reaction of 1:1 ratio of phenylstearic and phenylene distearic acid reacted with diethanol amine _____ Self-extinguishing.

Presently available commercial polyurethanes prepared from polyethers have a burning rate of 7.9 inches per minute when subjected to the ASTM Test No. 1692 (Dow Chemical Company, Midland, Mich., Bulletin VR-1, 1963, page 11).

EXAMPLE VII

Polyurethane foam as prepared in Example II was cut into 5″ x 5″ x 1″ blocks, the depth of 1″ being parallel to the direction of foam rise. Two blocks were placed in an air-circulating oven at 125° C. and samples were measured for maximum dimensional change daily over a 7-day period. The greatest linear change was found to be in the direction perpendicular to the direction of foam rise.

MAXIMUM CHANGE IN LINEAR DIMENSION AND VOLUME FROM ORIGINAL SIZE

| Days | Maximum percent change | |
|---|---|---|
| | Maximum linear change, percent | Maximum volume change, percent |
| 1 | 1.36 | 3.01 |
| 2 | 1.80 | 5.19 |
| 3 | 2.06 | 5.02 |
| 4 | 1.97 | 5.07 |
| 5 | 2.34 | 5.65 |
| 6 | 2.44 | 6.14 |
| 7 | 2.51 | 6.33 |

Typical presently available rigid polyether base polyurethane foams exhibit a linear change of 20% under the conditions of the above test. (Bulletin No. A–50938, Elastomers Chemical Department, E. I. du Pont Company, Wilmington, Del., June 21, 1963 revised 1966, page 30.)

While in the foregoing specification this invention has been described in relation to certain preferred embodiments thereof, and many details have been set forth for purpose of illustration, it will be apparent to those skilled in the art that the invention is susceptible to additional embodiments and that certain of the details herein can be

I claim:

1. Polyurethanes obtained by the condensation of polyhydroxamides having the formula

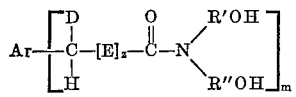

wherein Ar is selected from mono-, di- and tri-carbocyclic aromatic groups and their substituted derivatives wherein the substitution is 1 to 2 radicals selected from the group consisting of methyl, methoxy, phenoxy, and phenyl; D is selected from the group consisting of hydrogen, alkyl radicals having 1 to about 21 carbon atoms and alkenyl radicals having 2 to about 21 carbon atoms, E is selected from the group consisting of alkylene radicals having 1 to about 21 carbon atoms and unsaturated divalent hydrocarbon aliphatic radicals having 2 to about 21 carbon atoms, provided the total number of carbon atoms in the

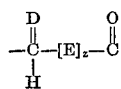

radical is less than about 30; $z$ is selected from the integers 0 and 1; $m$ is an integer of 1 to about 4; and R' and R'' are divalent alkylene groups having 1 to 8 carbon atoms; and polyisocyanates having the formula

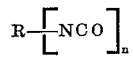

wherein R is selected from polyvalent aliphatic hydrocarbon radicals having 2 to about 40 carbon atoms, polyvalent alicyclic hydrocarbon radicals having from about 5 to 20 carbon atoms, polyvalent aromatic hydrocarbon radicals having 6 to about 10 carbon atoms, polyvalent arylalkyl radicals having 7 to about 24 carbon atoms, and $n$ is an integer of 2 to about 4.

2. The compounds of claim 1 wherein said polyhydroxamide has the formula

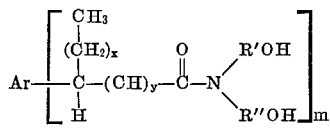

wherein $x$ is an integer from 0–20 and $y$ is an integer from 0–20 provided the sum of $x$ and $y$ is less than 27.

3. The compounds of claim 2 wherein $x$ and $y$ are integers of 0 to 15 and the sum of $x$ and $y$ is 15.

4. The compounds of claim 1 wherein said polyisocyanate is a diisocyanate.

References Cited

UNITED STATES PATENTS

| | | | |
|---|---|---|---|
| 3,267,080 | 8/1966 | Kamal | 260—77.5 |
| 3,074,983 | 1/1963 | Barrett et al. | 260—413 |
| 2,275,312 | 3/1942 | Tinker et al. | 260—515 |
| 2,463,942 | 3/1949 | Behrens et al. | 260—558 |
| 3,282,939 | 11/1966 | Spivack et al. | 260—247.7 |

WILLIAM H. SHORT, Primary Examiner

L. L. LEE, Assistant Examiner

U.S. Cl. X.R.

117—161 KP; 260—2.5 AQ, 2.5 AM, 77.5 AQ, 404.5, 558 R, 559 R, 559 D